United States Patent

[11] 3,582,117

| [72] | Inventor | Hans Per Olof Lundstrom<br>Sandviken, Sweden |
|---|---|---|
| [21] | Appl. No. | 809,812 |
| [22] | Filed | Mar. 24, 1969 |
| [45] | Patented | June 1, 1971 |
| [73] | Assignee | Sandvikens Jernverks Aktiebolag<br>Sweden |
| [32] | Priority | Apr. 10, 1968 |
| [33] | | Sweden |
| [31] | | 4805/68 |

[54] TUBULAR EXTENSION ROD FOR PERCUSSION DRILLING
1 Claim, 1 Drawing Fig.

[52] U.S. Cl. .................................................. 287/125, 285/390
[51] Int. Cl. ..................................................... E21b 17/042
[50] Field of Search............................................ 287/105, 103, 109, 119, 125; 285/399, 391, 390, 331, 355, 374, 333, 334

[56] References Cited
UNITED STATES PATENTS

| 316,865 | 4/1885 | Ball .............................. | 285/390X |
| 2,034,808 | 3/1936 | Graham ....................... | 285/399X |
| 2,065,595 | 12/1936 | Lynch ........................... | 29/156 |

FOREIGN PATENTS

| 186,078 | 11/1963 | Sweden ........................ | |

Primary Examiner—David J. Williamowsky
Assistant Examiner—Wayne L. Shedd
Attorney—Pierce, Scheffler & Parker ABSTRACT: Tubular extension rod, for percussion drilling, having an internal thread at one end and an external thread at the opposite end thereof. The intermediate portion of the rod—which constitutes the greater part of the total rod—has a uniform wall thickness, whilst both of the threaded end portions are inwardly upset so that external mantle surface of a plurality of coupled extension rods is even and has the same external diameter at the joints as at the intermediate portions.

PATENTED JUN 1 1971 3,582,117
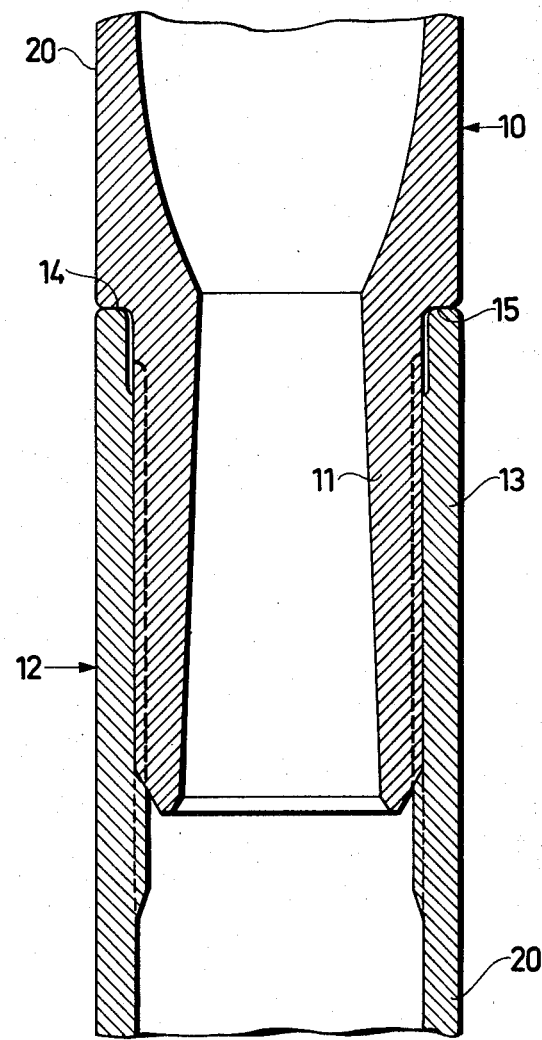

TUBULAR EXTENSION ROD FOR PERCUSSION DRILLING

The present invention relates to a tubular extension rod for percussion drilling. A percussion drill rod is composed of a number of extension rods which are joined by means of thread connections. Usually this has been done so that each extension rod has an external thread at both ends, and the rods are joined by means of internally threaded coupling sleeves.

It has been found that these coupling sleeves in an unexpected high degree cause losses in the transmission of percussion energy from the drilling machine to the drill bit. These losses depend to a substantial extent on the mass of the sleeves, and in order to lessen said mass it has been suggested to replace the separate extension sleeves by sleeve portions, forged in one piece with the extension rods, so that each extension rod has an external thread at one end and a matching internal thread at the other end. The internally threaded part forms a sleeve which in the same way as a separate extension sleeve has a greater outer diameter than the rest of the rod. This involves the disadvantage that the composite rod acquires a varying external diameter which obstructs the passage of cuttings rearwardly between the drill rod and the wall of the drill hole.

An object of the present invention is to provide an improvement of the said type of extension rod with an internal thread at one end consisting therein that the rods that are screwed together have an even outer surface with a constant outer diameter, and the threaded portions and the contact surfaces between the rods are adapted in relation thereto.

The invention will now be described in greater detail in the following specification and illustrated in the annexed drawing showing a joint consisting of (according to the invention) two extension rods that are screwed together.

The extension rod 10 in the FIGURE has at its lower end an external thread along a portion 11 which for this purpose has been formed by upsetting (forging). The extension rod 12 has at its upper end a matching internal thread along a portion 13, which also is formed by upsetting. The extension rods are all alike, and the rod 10 has thus at its not shown end an internally threaded portion 13 and the rod 12 at its not shown end an externally threaded portion 11. In the FIGURE the rods have the external thread turned downwards but it may instead be turned upwards. Between the threaded portions each extension rod has a cylindrical portion 20 with a uniform wall thickness, said portion comprising the main part of the length of the extension rod which usually is 2—6 meters.

The threaded end portions are formed by upsetting a blank, which before the upsetting has an even wall thickness along its whole length, thus forming the end portions shown in the FIGURE having a smaller diameter than the part 20. After the upsetting the thread is performed. The internally threaded portion 13 has a somewhat smaller inner diameter than the portion 20, and the externally threaded portion 11 has a smaller inner diameter than the portion 13. It is essential that the inwardly upset parts of the portions 13 and 11 have so small mass as possible in order to lessen the energy losses, and thus especially the portion 11 should have as short a length and as little thickness as possible.

In order to obtain an axial contact between the rods the portion 11 has at the base of the thread a shoulder 14 against which the end 15 of the adjoining portion 13 abuts. The contact surfaces 14 and 15 are situated in the extension of the intermediate portions 20 of the rods, so that the percussion energy when passing along the portions 20 is transferred straight through the contact surfaces, which contributes to rendering the energy losses as small as possible. The surfaces 14 and 15 may suitably be plane as shown in the FIGURE but they may have some other shape, for instance conical.

In order to obtain a full and firm contact between the surfaces 14 and 15 the thread must be cylindrical, i.e. have a constant diameter. The thread should be of a type that is suitable for percussion drilling, having a relatively great pitch and at least partly rounded longitudinal section.

From the foregoing it is clear that the extension rod according to the invention is formed to cause as small losses as possible in the transfer of energy from the drilling machine to the drill bit. Moreover, the rod provides the advantage that a drilling rod, composed of several extension rods, has an even external surface, so that the cuttings have a free (i.e., uninterrupted) passage along the outside of the rod, and also the risk that the drill rod should get stuck in the drill hole is lessened, which risk is present especially in case the rock is fissured. In comparison with separate coupling sleeves the extension rod according to the invention provides the advantage that the number of separate parts in a drill rod is lessened, so that it becomes simpler to couple the rods together. By the invention is thus obtained a gain of time partly because of a high penetration rate and partly because of the simplified coupling procedure.

I claim:
1. Tubular extension rod for percussion drilling comprising an unthreaded middle portion (20) and threaded end portions for coupling the extension rod to other similar extension rods,
   one end portion (11) having an external thread and the other end portion (13) a matching internal thread, the thread being cylindrical and of a type that is suitable for percussion drill rods, in which rod
   both threaded end portions are inwardly upset so that the internally threaded portion (13) has a smaller internal diameter than has the middle portion (20) of the rod, and the externally threaded portion (11) has a still smaller internal diameter,
   the extension rod at the base of the external thread having a shoulder forming a contact surface (14) and the end surface of the internally threaded portion forming a corresponding contact surface (15), said contact surfaces being plane and constituting the only axial abutment between two similar extensions rods which are screwed together,
   the contact surfaces (14,15) 15) being positioned substantially in the extension of the unthreaded middle portion (20) and
   the external mantle surface of two coupled extension rods is even and has the same external diameter along the joint as along the rest of the rods.